No. 823,340. PATENTED JUNE 12, 1906.
A. LINDGREN.
DEVICE FOR SECURING SHOVEL STANDARDS TO CULTIVATOR BEAMS.
APPLICATION FILED MAR. 21, 1906.
2 SHEETS—SHEET 1.
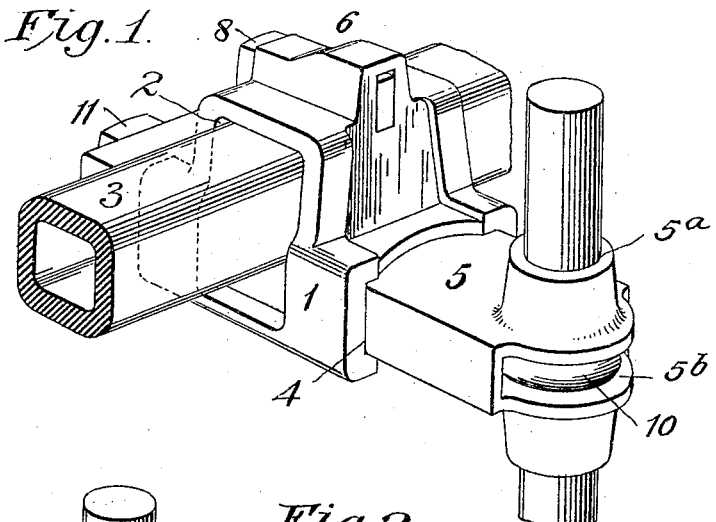
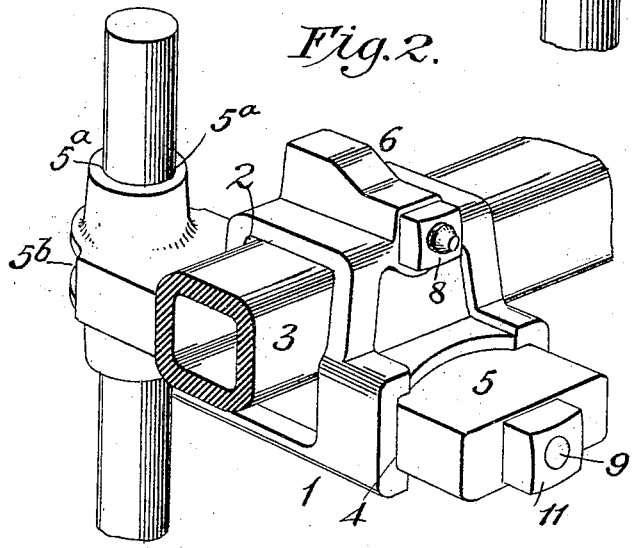

No. 823,340. PATENTED JUNE 12, 1906.
A. LINDGREN.
DEVICE FOR SECURING SHOVEL STANDARDS TO CULTIVATOR BEAMS.
APPLICATION FILED MAR. 21, 1906.
2 SHEETS—SHEET 2.
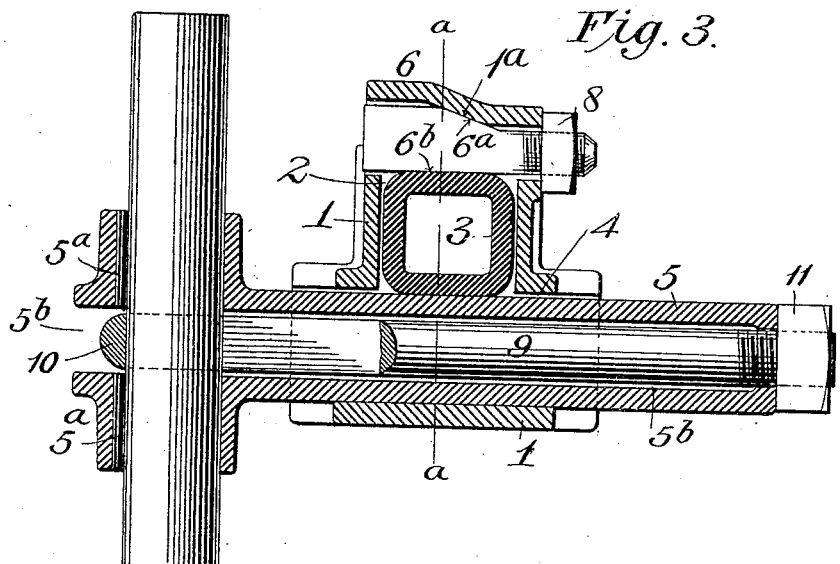
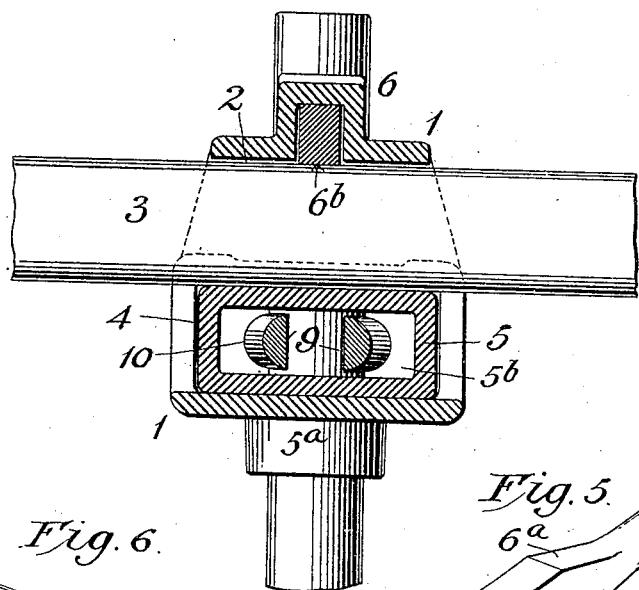
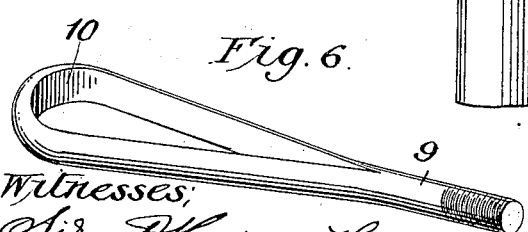
Witnesses:
Inventor
August Lindgren
By Philip T. Dodge
Attorney.

UNITED STATES PATENT OFFICE.

AUGUST LINDGREN, OF MOLINE, ILLINOIS, ASSIGNOR TO MOLINE PLOW COMPANY, A CORPORATION OF ILLINOIS.

DEVICE FOR SECURING SHOVEL-STANDARDS TO CULTIVATOR-BEAMS.

No. 823,340.   Specification of Letters Patent.   Patented June 12, 1906.

Application filed March 21, 1906. Serial No. 307,156.

*To all whom it may concern:*

Be it known that I, AUGUST LINDGREN, of Moline, county of Rock Island, and State of Illinois, have invented a new and useful Improvement in Devices for Securing Shovel-Standards to Cultivator-Beams, of which the following is a specification.

This invention relates to devices for securing shovel-standards and the like to the beams of agricultural implements in order that the standard may be adjusted vertically, transversely, and also longitudinally relative to the beam.

The invention consists of a fastening device of improved form and construction embodying a member or yoke formed with an opening extending longitudinally therethrough to loosely receive the beam, and with a second opening or socket communicating with the first and extending transversely thereof to loosely receive a standard or shank holder, a clamping device being provided to hold said parts firmly in fixed relations and permit of their relative adjustments, and the standard-holder being provided with means for securing the shank thereto, so that it may be adjusted vertically.

The invention also consists in the details of construction and combination of parts hereinafter described and claimed.

In the accompanying drawings, Figure 1 is a perspective view of my improved fastening device applied to a cultivator-beam, showing the shovel-standard sustained thereby. Fig. 2 is a perspective view of the same, on an enlarged scale, as viewed from the opposite side. Fig. 3 is a sectional elevation taken transversely of the beam. Fig. 4 is a view in section on the line *a a* of the preceding figure. Figs. 5 and 6 are perspective views of details of the device.

Referring to the drawings, my improved fastening device consists of a yoke or casting 1, formed with a longitudinal opening or passage-way 2 to receive the beam 3 and formed beneath this opening with a transverse socket or opening 4 to receive a standard-holder 5, which when the parts are assembled will extend transversely beneath the beam and in contact therewith, a clamping device 6 being carried by the yoke and adapted by its coöperation with the beam to draw the parts firmly together and bind the standard-holder fixedly against the under side of the beam.

The clamping device is in the form of a transversely-extending endwise-movable bolt or key, having an upper inclined face $6^a$, bearing against and coöperating with an inclined surface $1^a$ within the yoke above the beam-opening, the lower face of the bolt being formed with a flat horizontal surface $6^b$, adapted to bear against the upper side of the beam, the movement of the bolt endwise between the inclined surface of the yoke and the beam acting to spread these parts and thereby, through the medium of the encircling yoke, to draw the standard-holder up tightly against the under side of the beam. The endwise clamping movement of the bolt is effected by means of a nut 8, applied to the threaded end of the bolt and bearing against the side of the yoke the loosening of the bolt releasing the parts and permitting of their adjustment and the tightening of the bolt serving to draw up the parts and bind them firmly together.

It is manifest that the form of the clamping device may be modified and variously changed without departing from the limits of my invention, the essential requirement in this respect being that there shall be means for binding the standard-holder firmly against the beam, so that when the parts are released they may be adjusted along the beam longitudinally or the standard-holder may be adjusted transversely and thereafter secured in their adjusted position.

The standard-holder is in the form of an elongated block or casting, mounted in its socket to slide therein endwise and having in one end a vertical opening or socket $5^a$ to receive the standard. Communicating with this socket is an opening $5^b$, extending through the block from end to end to receive an eyebolt 9, having its eye 10 arranged in alinement with the standard-socket, so as to receive said standard and having its opposite end threaded to receive a nut 11, adapted to bear against the end of the block, by means of which the shank may be drawn up tightly in the socket and held firmly in position relative to the block. By loosening the nut the standard will be released and may be set vertically to the position desired, after which, the nut being again tightened up, it will be held firmly in its adjusted position.

From the construction described it will be seen that the shovel may be adjusted longitudinally of the beam by releasing the clamping-wedge, which will also permit of the transverse adjustment of the shovel, this adjustment being effected by moving the standard holder or block transversely in its opening in the yoke. It is further seen that the shovel may be adjusted vertically, this being effected by loosening the nut 11 to release the standard.

It is obvious that my improved fastening device may be used for securing the teeth of harrows to the tooth-bars, the shanks of colters to their supporting parts, and for other purposes where the adjustments described are desired.

Having thus described my invention, what I claim is—

1. In combination with a beam, a standard-fastening device, comprising a yoke formed with an opening for the beam, and with a second opening extending transversely of and in a plane parallel with the first and communicating therewith, and adapted to receive a standard-holder, a standard-holder mounted in the second opening, means for clamping said parts in fixed relations, and means carried by the standard-holder for securing the standard thereto.

2. The combination with a beam, of a standard-fastening device, comprising a yoke having an opening for the beam, and having a second opening extending transversely of and in a plane parallel with the first and communicating therewith, a standard-holder adapted to be adjusted transversely in the second opening, and a clamping-key adapted to clamp the parts in fixed relations, and means carried by the standard-holder for securing the standard thereto.

3. The combination with a beam, of a standard-fastening device, comprising a yoke having an opening for the beam, and having a second opening extending transversely of and in a plane parallel with the first and communicating therewith, a standard-holder adapted to be adjusted transversely in the second opening, means for clamping said parts in fixed relations, and a standard carried by the holder and adjustable vertically with relation thereto.

4. In combination with the beam, a standard-fastening device consisting of a yoke or member formed with a longitudinal opening to loosely receive the beam, with a transverse opening, and with an inclined surface, a standard-holder mounted in the transverse opening, and a clamping-key provided with an inclined face adapted to coöperate with the inclined surface on the yoke and clamp the said parts firmly together.

5. In combination with a beam, a yoke formed with a longitudinal opening to receive the beam, with an inclined wall above said opening, and with a transverse opening beneath the beam, a standard-holder mounted in the transverse opening and bearing against the under side of the beam, and a wedge-shaped key extending along the upper side of the beam and adapted to coöperate with the inclined wall of the yoke to firmly clamp said parts together.

6. In a standard-support, the combination with a yoke provided with two openings extending therethrough at an angle relatively, and communicating with each other and adapted to receive respectively the beam and a standard-holder, said yoke being provided further with an inclined wall adjacent one of said openings, of a key provided with an inclined face adapted to coöperate with said wall.

7. In combination with a beam, a yoke provided with an opening to receive the same and with a second transversely-extending opening, a standard-holder mounted in the second opening and contacting with the beam, a clamping device carried by the yoke and adapted by its coöperation with the beam and holder to hold said parts in fixed relations, and means carried by the holder for securing the standard thereto.

8. In combination with the beam, a yoke formed in its upper end with a longitudinal opening to loosely receive the beam and formed below said opening with a transversely-extending opening connected therewith, an elongated block mounted in the lower opening, a clamping device adapted to coöperate with the beam and hold said parts in fixed relations, an eyebolt extending endwise through the standard-holder, a standard mounted in the eye of said bolt, and a nut applied to the end of the bolt.

9. The improved standard supporting and fastening device, comprising in combination, a yoke formed with angularly-arranged horizontal openings to loosely receive a beam and standard-holder respectively, a standard-holder mounted in its opening in the yoke and adapted to bear against the beam, a device for binding the said holder firmly against the beam, and adapted to be actuated to release said parts to permit of adjustment, and means carried by the standard-holder for securing the standard adjustably thereto.

10. In combination with a horizontal beam, a standard-fastening device comprising a yoke formed with a horizontal opening to loosely receive the beam and formed with a second horizontal opening extending transversely of the first and communicating therewith, a standard-holder mounted loosely in the second transverse opening, means for clamping said parts in fixed relations; whereby when released the yoke may be adjusted along the beam and the standard-holder may be adjusted transversely within its opening in the yoke, and a standard mounted in the standard-holder and adjustable vertically therein.

In testimony whereof I hereunto set my hand, this 15th day of February, 1906, in the presence of two attesting witnesses.

AUGUST LINDGREN.

Witnesses:
M. MURPHY,
J. T. SIMMONS.